United States Patent
Choi et al.

(10) Patent No.: US 9,392,618 B2
(45) Date of Patent: Jul. 12, 2016

(54) METHOD AND APPARATUS FOR CONTROLLING CHANNEL ACCESS IN WIRELESS LAN SYSTEM

(71) Applicant: LG ELECTRONICS INC., Seoul (KR)

(72) Inventors: Jinsoo Choi, Anyang-si (KR); Seunghee Han, Anyang-si (KR); Yongho Seok, Anyang-si (KR); Jeongki Kim, Anyang-si (KR); Jinsam Kwak, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 106 days.

(21) Appl. No.: 14/388,973

(22) PCT Filed: Mar. 29, 2013

(86) PCT No.: PCT/KR2013/002638
§ 371 (c)(1),
(2) Date: Sep. 29, 2014

(87) PCT Pub. No.: WO2013/147549
PCT Pub. Date: Oct. 3, 2013

(65) Prior Publication Data
US 2015/0085775 A1    Mar. 26, 2015

Related U.S. Application Data

(60) Provisional application No. 61/617,054, filed on Mar. 29, 2012.

(51) Int. Cl.
| | |
|---|---|
| *H04L 12/26* | (2006.01) |
| *H04J 3/00* | (2006.01) |
| *H04B 7/212* | (2006.01) |
| *H04W 72/00* | (2009.01) |
| *G06F 15/173* | (2006.01) |
| *H04W 74/00* | (2009.01) |
| *H04W 74/08* | (2009.01) |
| *H04W 84/12* | (2009.01) |

(52) U.S. Cl.
CPC ........ *H04W 74/002* (2013.01); *H04W 74/0808* (2013.01); *H04W 84/12* (2013.01)

(58) Field of Classification Search
CPC ..... H04W 24/02; H04W 28/10; H04W 28/18; H04W 48/06; H04W 72/12; H04W 72/1242; H04W 74/00; H04W 74/002; H04W 74/04; H04W 74/08; H04W 74/0808; H04W 84/12; H04L 1/1887
USPC ................. 370/229–238, 252, 310–350, 437, 370/442–448, 464–465, 477–480, 370/498–521; 455/450–453, 509, 515–517; 709/223–226, 229–236, 238–244
See application file for complete search history.

(56) References Cited

U.S. PATENT DOCUMENTS

| | | |
|---|---|---|
| 6,671,284 B1 | 12/2003 | Yonge, III et al. |
| 7,174,374 B2 | 2/2007 | Wang et al. |

(Continued)

FOREIGN PATENT DOCUMENTS

EP    2257001    12/2010

OTHER PUBLICATIONS

PCT International Application No. PCT/KR2013/002638, Written Opinion of the International Searching Authority dated Jul. 26, 2013, 14 pages.

*Primary Examiner* — Tri H Phan
(74) *Attorney, Agent, or Firm* — Lee, Hong, Degerman, Kang & Walmey; Jonathan Kang; Richard Salfelder

(57) ABSTRACT

The present invention relates to a wireless communication system, and a method and apparatus for controlling channel access in a wireless LAN system. The method for controlling the channel access of a station (STA) of a wireless communication system according to the present invention comprises detecting a short frame transmitted by another STA; and deferring the channel access of the STA by a predetermined length of time. The short frame is a frame that triggers a service period during which the transceiving of a plurality of data frames of the other STA is allowed. The predetermined length of time can be set to the value corresponding to the length of time ranging from the start of the service period to the point in time at which the transceiving of a first data frame from among the plurality of data frames of the other STA is completed.

12 Claims, 20 Drawing Sheets

(56) References Cited

U.S. PATENT DOCUMENTS

| | | | | |
|---|---|---|---|---|
| 8,576,761 B1* | 11/2013 | Pitchaiah | H04W 52/02006 | 370/311 |
| 2004/0196850 A1* | 10/2004 | Ho | H04W 72/1257 | 370/395.4 |
| 2007/0161364 A1* | 7/2007 | Surineni | H04W 52/0225 | 455/343.4 |
| 2009/0016306 A1 | 1/2009 | Wang et al. | | |
| 2010/0309835 A1* | 12/2010 | Kuo | H04W 72/005 | 370/312 |
| 2011/0310837 A1 | 12/2011 | Classon et al. | | |
| 2012/0177013 A1* | 7/2012 | Trainin | H04W 72/1205 | 370/336 |
| 2014/0204821 A1* | 7/2014 | Seok | H04W 52/0206 | 370/311 |

\* cited by examiner

| Short Frame Indication | Short Frame Type | Short Frame subtype | To DS | From DS | Via AP | PM | AC | EOSP | Retry | MD | Protected | Reserved |
|---|---|---|---|---|---|---|---|---|---|---|---|---|
| 1 bit | 1 bit | 2 bit | 1 bit | 1 bit | 1 bit | 1 bit | 2 bits | 1 bit | 1 bit | 1 bit | 1 bit | 2 bits |

| Short Frame Control | RA | TA | FCS |
|---|---|---|---|
| 2 octets | 6 octets | 6 octets | 4 octets |

(b)

| Short Frame Indication | Short Frame Type | Short Frame subtype | To DS | From DS | Via AP | PM | AC | EOSP | Max SP Length | Rsvd |
|---|---|---|---|---|---|---|---|---|---|---|
| 1 bit | 1 bit | 2 bit | 1 bit | 1 bit | 1 bit | 1 bit | 2 bits | 1 bit | 2 bits | 3 bits |

FIG. 18

| 2 octets | 2 (or 1) octets | 6 octets | 6 octets | 4 octets |
|---|---|---|---|---|
| Short Frame Control | Duration | RA | TA | FCS |

METHOD AND APPARATUS FOR CONTROLLING CHANNEL ACCESS IN WIRELESS LAN SYSTEM

CROSS-REFERENCE TO RELATED APPLICATIONS

This application is the National Stage filing under 35 U.S.C. 371 of International Application No. PCT/KR2013/002638, filed on Mar. 29, 2013, which claims the benefit of U.S. Provisional Application Ser. No. 61/617,054, filed on Mar. 29, 2012, the contents of which are hereby incorporated by reference herein in their entirety.

TECHNICAL FIELD

The following description relates to a wireless communication system and, more particularly, to a method and apparatus for controlling channel access in a wireless local area network (LAN) system.

BACKGROUND ART

Along with the development of information and communication technology, various wireless communication technologies have been developed. Thereamong, wireless local area network (WLAN) enables users to wirelessly access the Internet through their portable terminals such as personal digital assistants (PDAs), laptop computers, and portable multimedia players (PMPs) in homes, offices, or specific service areas, based on wireless frequency technology.

To overcome limits to communication speed, which are a weakness of WLAN, systems for increasing speed and reliability of a network and extending wireless network coverage have been introduced in recent technology standards. For example, IEEE 802.11n supports a high throughput (HT) of a data processing rate of up to 540 Mbps or higher and adopts multiple input multiple output (MIMO) technology in both a transmitter and a receiver in order to minimize transmission errors and optimize data rate.

DETAILED DESCRIPTION OF THE INVENTION

Technical Problems

As next-generation communication technology, machine-to-machine (M2M) communication technology has been discussed. In an IEEE 802.11 WLAN system, a technology standard for supporting M2M communication has been developed as IEEE 802.11ah. A scenario in which devices occasionally exchange less data at low speed in an environment in which many devices are present may be considered in M2M communication.

Communication in the WLAN is performed by a medium shared between all devices. If the number of devices increases as in M2M communication, much time consumption for channel access of one device may cause degradation of system performance and hinder power saving of each device.

An object of the present is to provide a new mechanism for controlling channel access.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention to achieve the technical objects, provided herein is a channel access control method of a station (STA) of a wireless communication system, including detecting a short frame transmitted by another STA; and deferring channel access of the STA during prescribed time length, wherein the short frame is a frame for triggering a serving period permitting transmission and reception of a plurality of data frames of the other STA, and the prescribed time length is set to a value corresponding to time length from a time when the service period is started to a time when transmission and reception of a first data frame among the data frames of the other STA is finished.

According to another embodiment of the present invention to achieve the technical objects, provided herein is a station (STA) for controlling channel access in a wireless communication system, including a transceiver module; and a processor, wherein the processor is configured to detect a short frame transmitted by another STA by using the transceiver; and defer channel access of the STA during prescribed time length, the short frame is a frame for triggering a serving period permitting transmission and reception of a plurality of data frames of the other STA, and the prescribed time length is set to a value corresponding to time length from a time when the service period is started to a time when transmission and reception of a first data frame among the data frames of the other STA is finished.

In the embodiments according to the present invention, the following may be commonly applied.

The prescribed time length may be set based on a value of a duration field included in the short frame.

The duration field may have a length of 1 octet.

The prescribed time length may be determined based on a maximum service period length field included in the short frame.

The maximum service period length field included in the short frame may be determined based on information about the number of the data frames transmitted and received by the other STA during the service period.

The prescribed time length may be determined by a value pre-provided in a basic service set (BSS) to which the STA belongs.

If the STA receives a plurality of pre-provided values, a most recently received value may be used.

The pre-provided value may be provided through a response frame to a request frame transmitted by the STA or through a broadcast signal transmitted to the STA.

The deferring the channel access may include setting a network allocation vector (NAV) corresponding to the prescribed time length.

The short frame may be defined as a frame excluding a frame body.

The short frame may be either a short data frame or a short null frame.

The above overall description and a later detailed description of the present invention are purely exemplary and are given as an additional description of the present invention determined by the appended claims.

Advantageous Effects

According to the present invention, a new mechanism implementation method and device for controlling channel access can be provided.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 16 is a diagram for explaining an exemplary short frame format.

FIG. 18 is a diagram for explaining a new short frame format proposed in the present invention.

BEST MODE FOR CARRYING OUT THE INVENTION

Figure 1:
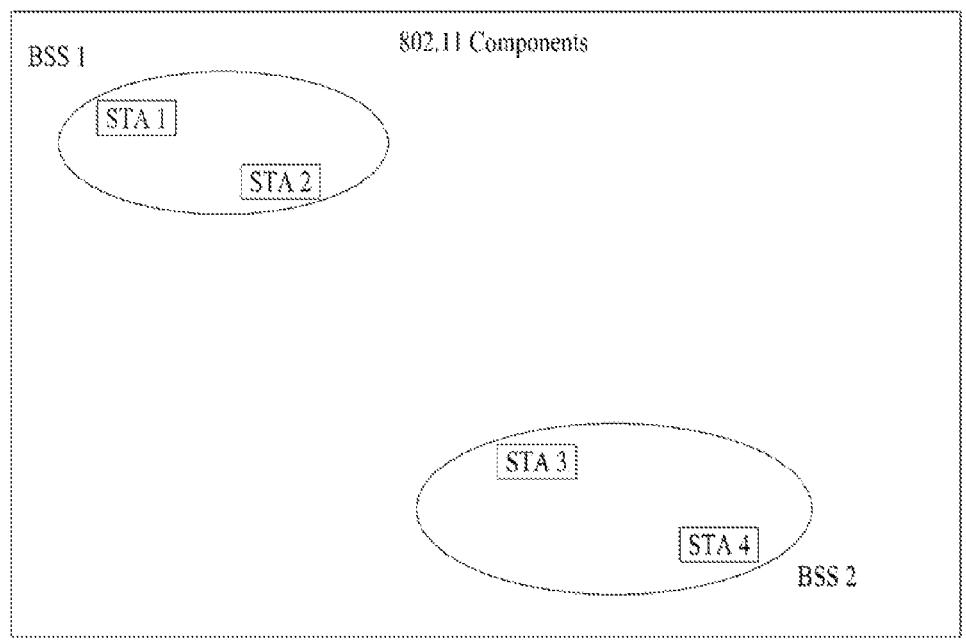
FIG. 1 is a diagram illustrating an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments described hereinbelow are combinations of elements and features of the present invention in a predetermined format. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope of technical idea of the present invention.

In some instances, well-known structures and devices are omitted in order to avoid obscuring the concepts of the present invention or the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts which are not described to clarify the technical idea of the present invention, reference may be made to these documents. Further, all terms as set forth herein can be explained by the standard documents.

The following technologies may be applied to a variety of radio access systems including a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as IEEE 802.11 (Wi-Fi), IEEE 802.16 (WiMAX), IEEE 802.20, or evolved-UTRA (E-UTRA). For clarity, although the following description is given based on an IEEE 802.11 system, the technical idea of the present invention is not limited thereto.

Structure of WLAN System

FIG. 1 is a diagram illustrating an exemplary structure of an IEEE 802.11 system to which the present invention is applicable.

The structure of the IEEE 802.11 system may include a plurality of components. A WLAN which supports transparent mobility of a station (STA) with respect to a higher layer by mutual operations of the components may be provided. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a LAN may be configured as necessary instead of being prescheduled, which is called an ad-hoc network.

The Membership of STAs in the BSS may be dynamically changed when STAs enter an on or off state or the STA enters or leave a region of the BSS. To become a member of the BSS, an STA may use a synchronization process to join the BSS. To access all services of a BSS infrastructure, the STA should be associated with the BSS. Such association may be dynamically configured and may include use of a distributed system service (DSS).

Figure 2:
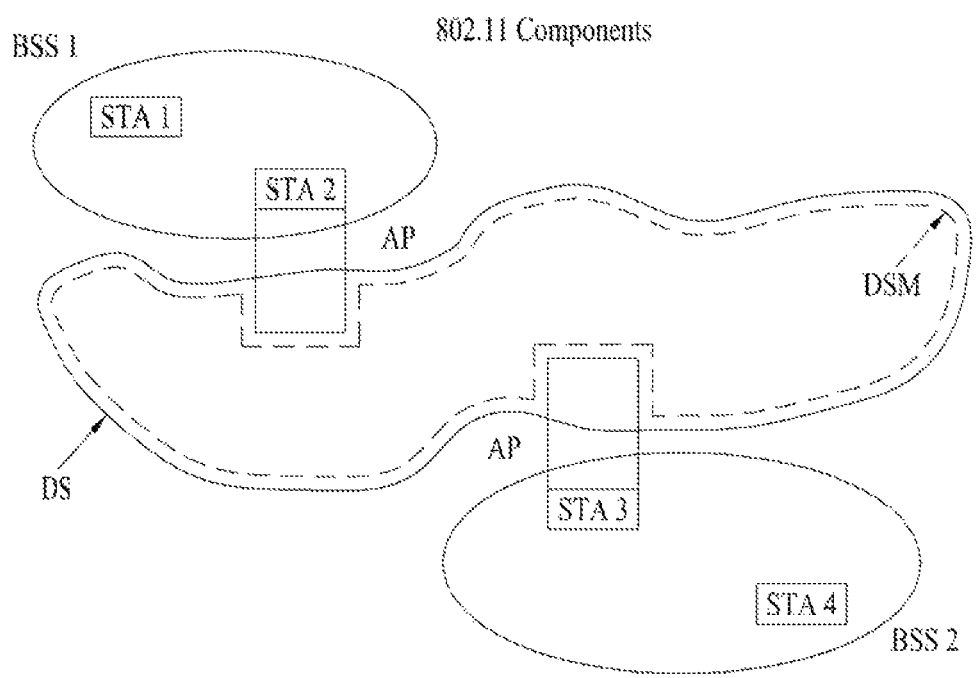
FIG. 2 is a diagram illustrating another exemplary structure of an IEEE 802.11 system to which the present invention is applicable.

FIG. 2 is a diagram illustrating another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by characteristics of the DSM. In relation to this, a wireless medium (WM) and the DSM are logically distinguished in IEEE 802.11 standards. Respective logical media are used for different purposes and are used by different components. In definition of IEEE 802.11 standards, such media are restricted to neither equal nor different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for managing an address of a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frames) may be transmitted to the DS.

Figure 3:
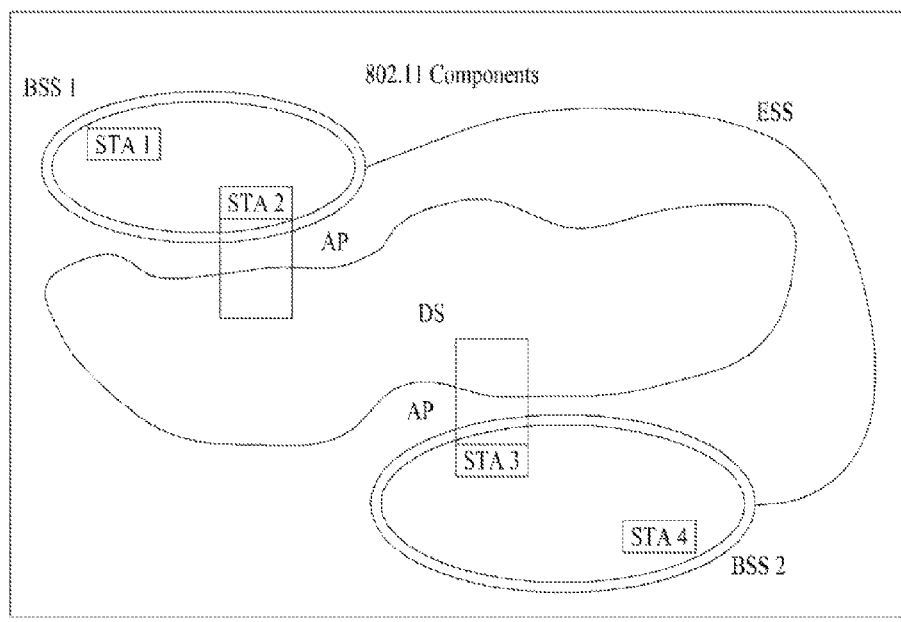
FIG. 3 is a diagram illustrating still another exemplary structure of an IEEE 802.11 system to which the present invention is applicable.

FIG. 3 is a diagram illustrating still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a network is referred to an ESS network. The ESS may correspond to a set of BSSs connected to one DS. However, the ESS does not include the DS. The ESS network characteristically appears as an IBSS network in a logical link control (LLC) layer. STAs included in the ESS may communicate with each other and mobile STAs are movable transparently with respect to the LLC layer from one BSS to another BSS (within the same ESS).

Nothing is assumed in IEEE 802.11, in relation to relative physical locations of the BSSs in FIG. 3 and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS network may be physically located in the same space as one (or more than one) ESS network. This may correspond to an ESS network form in the case in which an ad-hoc network operates in a location in which an ESS network is present, the case in which physically overlapping IEEE 802.11 networks are configured by different organizations or the case in which two or more different access and security policies are necessary in the same location.

Figure 4:
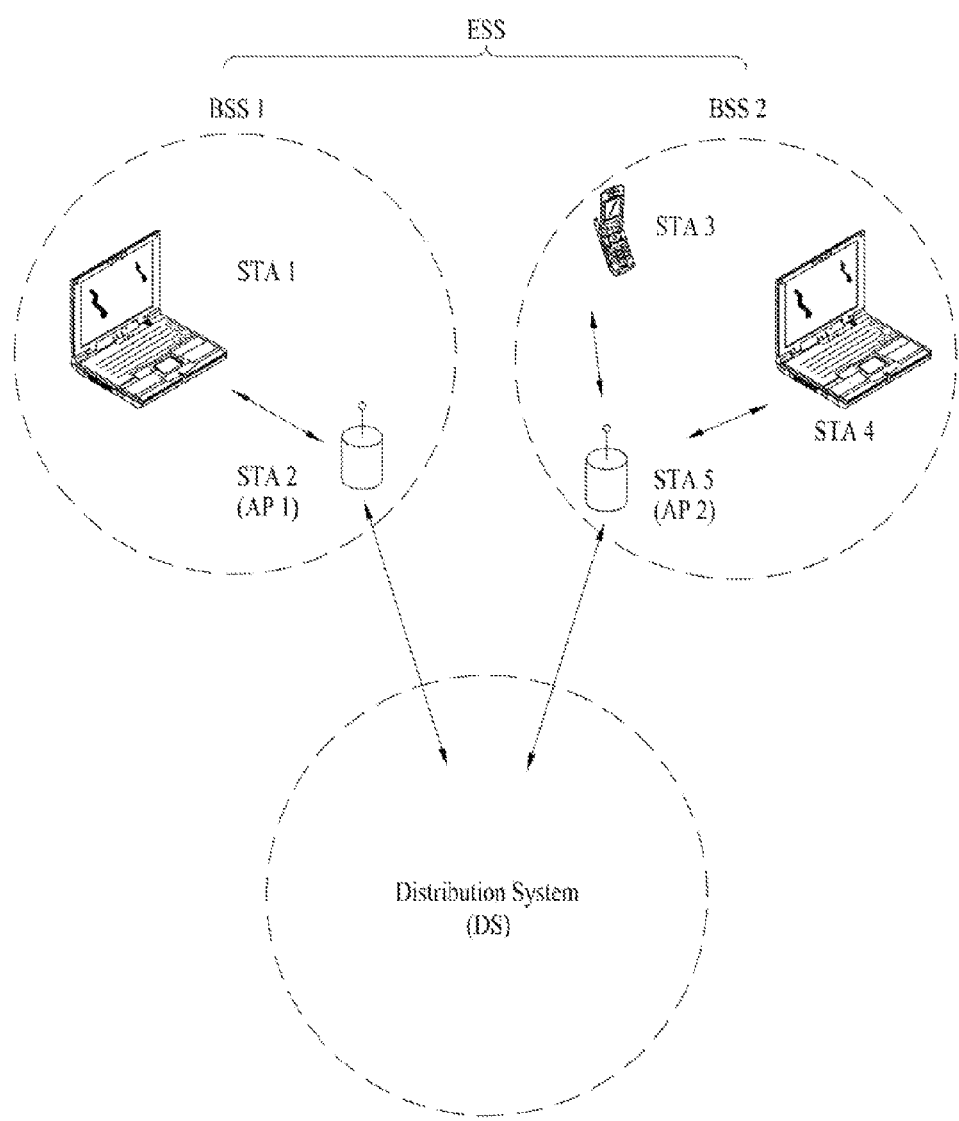
FIG. 4 is a diagram illustrating an exemplary structure of a WLAN system.

FIG. 4 is a diagram illustrating an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal (MT), or a mobile subscriber station (MSS). An AP corresponds to a base station (BS), a Node-B, an evolved Node-B (eNB), a base transceiver system (BTS), or a femto BS in other wireless communication fields.

Link Setup Process

Figure 5:
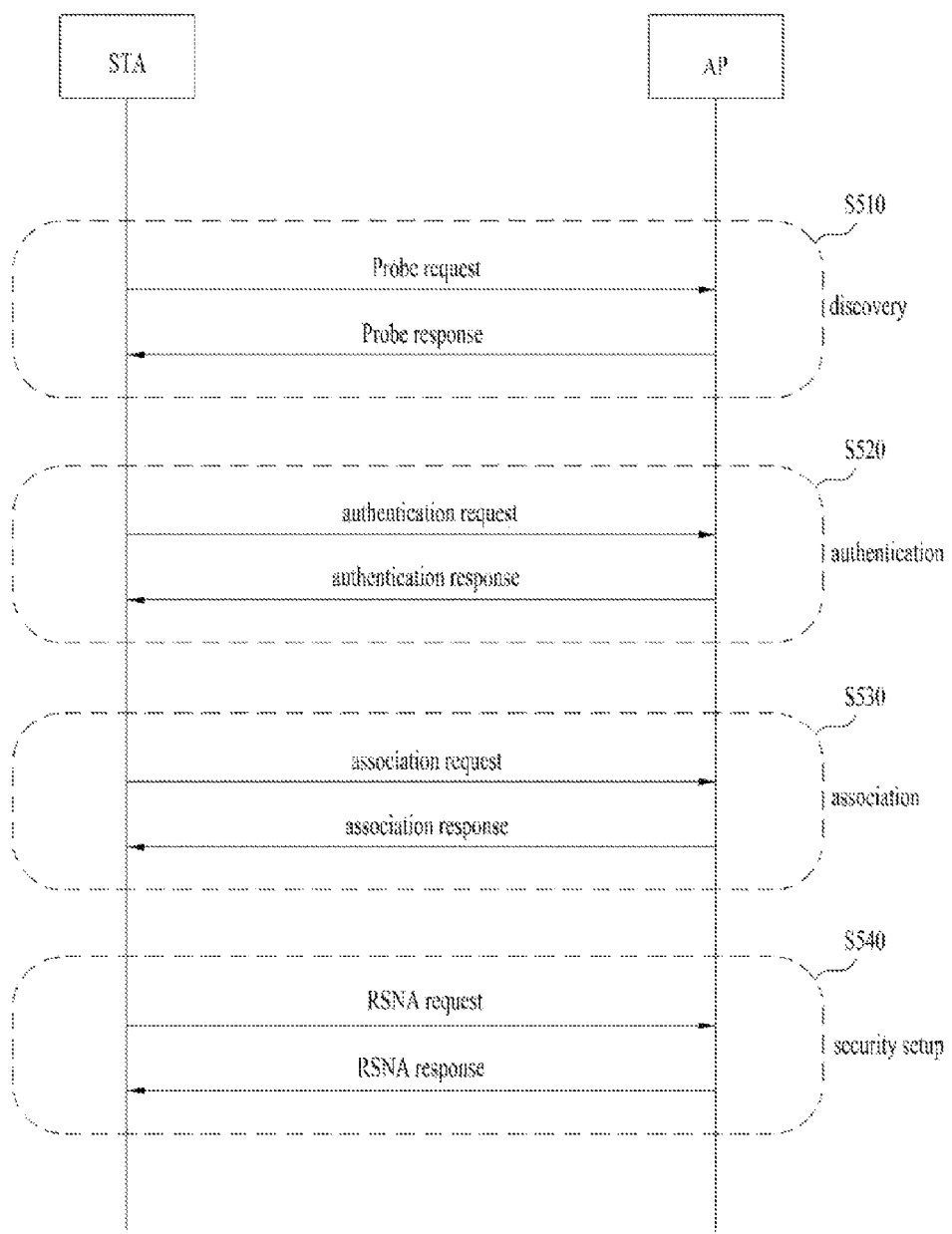
FIG. 5 is a diagram for explaining a link setup process in a WLAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also be called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association identification (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support for WLAN system operation in whitespace (WS) has been discussed. For example, technology for introducing the WLAN system in TV WS such as an idle frequency band (e.g. 54 to 698 MHz band) due to transition to digital TV from analog TV has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided in regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support for extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may perform clear channel assessment (CCS) for sensing a wireless channel or a medium during a predetermined time duration (e.g. DCF interframe space (DIFS)) before starting transmission. As a result of sensing, if it is determined that the medium is in an idle state, the AP and/or the STA starts frame transmission using the medium. Meanwhile, if it is sensed that the medium is in an occupied state, the AP and/or the STA does not start transmission thereof and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving quality of service (QoS) of a WLAN. In the HCF, QoS data may be transmitted in both a contention period (CP) and a contention-free period (CFP).

Figure 6:
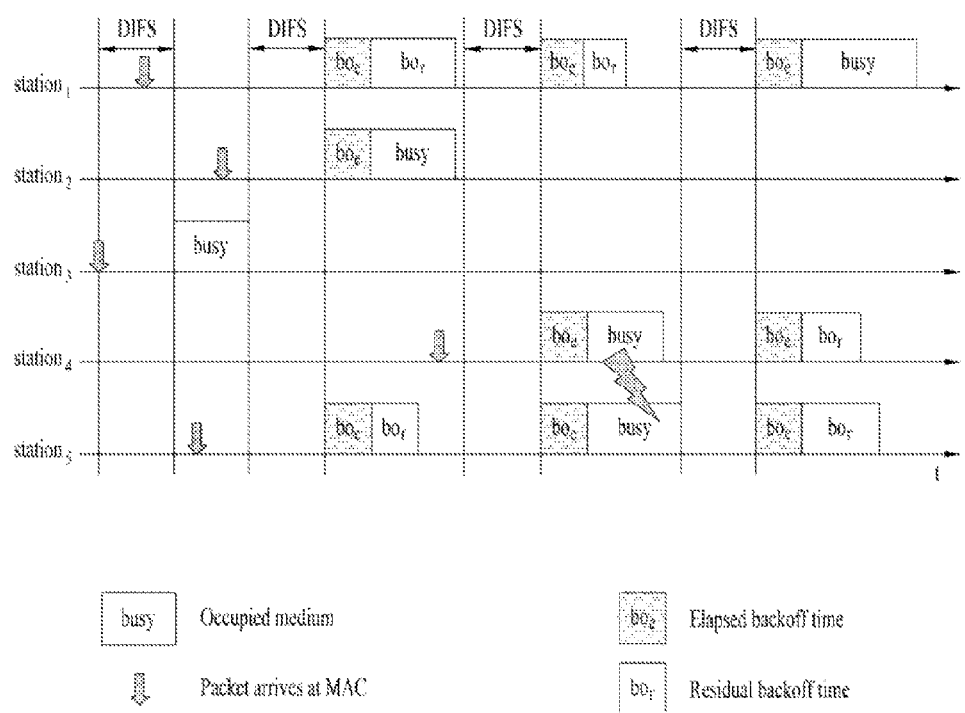
FIG. 6 is a diagram for explaining a backoff process.

FIG. 6 is a diagram for explaining a backoff process.

Operations based on a random backoff period will now be described with reference to FIG. 6. If a medium of an occupied or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to a value of 0 to CW. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. For example, CW, CWmin, and CWmax may be set to $2^n-1$ (where n=0, 1, 2, . . . ).

If the random backoff process is started, the STA continuously monitors the medium while counting down a backoff slot in response to the determined backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each of STA1, STA2, and STA5 waits for the DIFS time and then may perform countdown of the backoff slot in response to a random backoff count value selected thereby. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a DIFS time and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may double the CW value, select a random backoff count value, and then perform countdown. Meanwhile, STA1 may enter a standby state while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly sense a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used when an AP and/or an STA, which is currently using the medium or has authority to use the medium, indicates a remaining time until the medium enters an available state to anther AP and/or the STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, the NAV may be set according to the value of a Duration field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
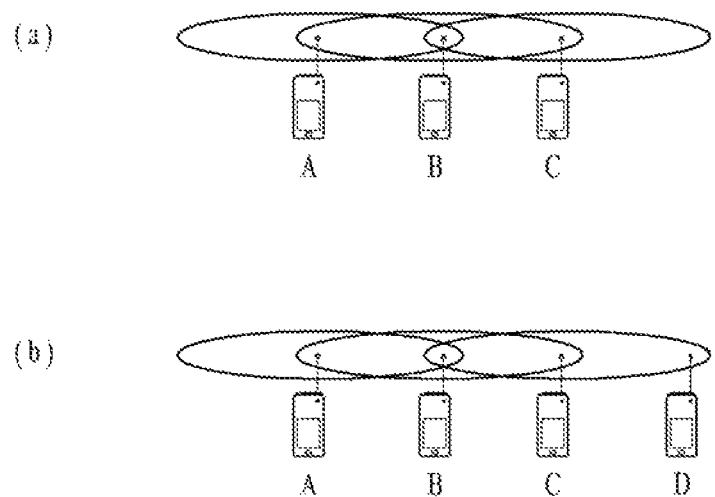
FIG. 7 is a diagram for explaining a hidden node and an exposed node.

FIG. 7 is a diagram for explaining a hidden node and an exposed node.

FIG. 7(a) exemplarily shows a hidden node. In FIG. 7(a), STA A is communicating with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
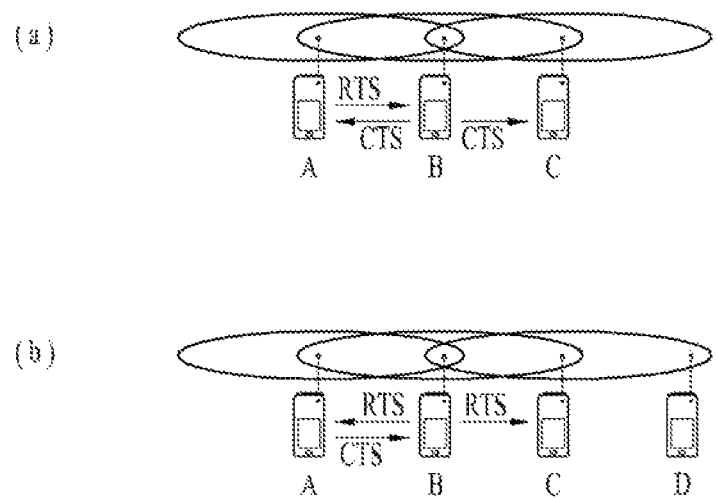
FIG. 8 is a diagram for explaining request to send (RTS) and clear to send (CTS).

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by neighboring STA(s), so that the neighboring STA(s) may consider whether information is transmitted between the two STAs. For example, if an STA to be used for data transmission transmits an RTS frame to an STA receiving data, the STA receiving data may inform neighboring STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity thereof. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all neighboring STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/ reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
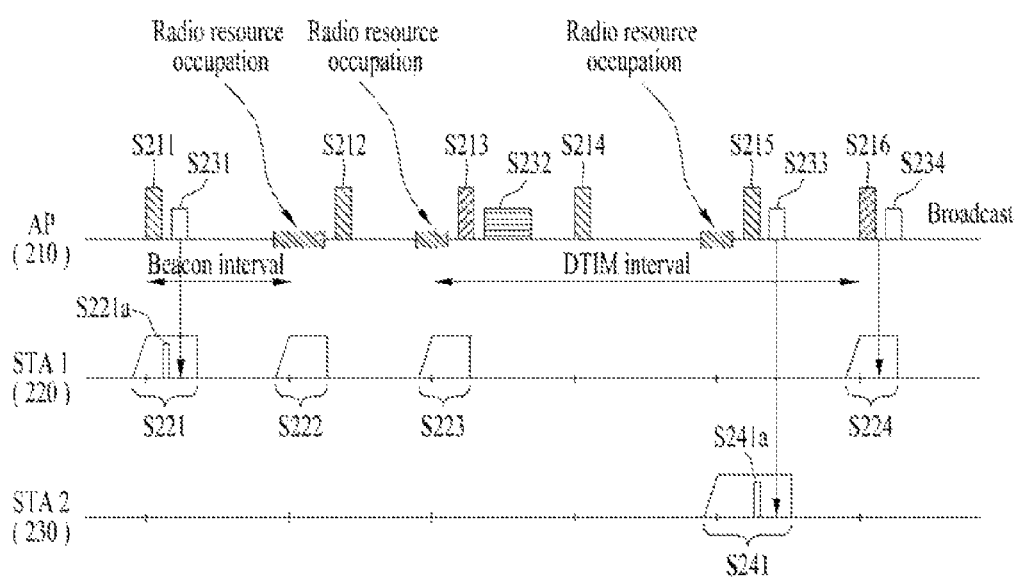
FIG. 9 is a diagram for explaining a power management operation.

FIG. 9 is a diagram for explaining a PM operation.

Referring to FIG. 9, an AP 210 transmits a beacon frame to STAs present in a BSS at intervals of a predetermined time (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/ multicast frame. The DTIM may be implemented through field setting of the TIM element.

Figure 10:
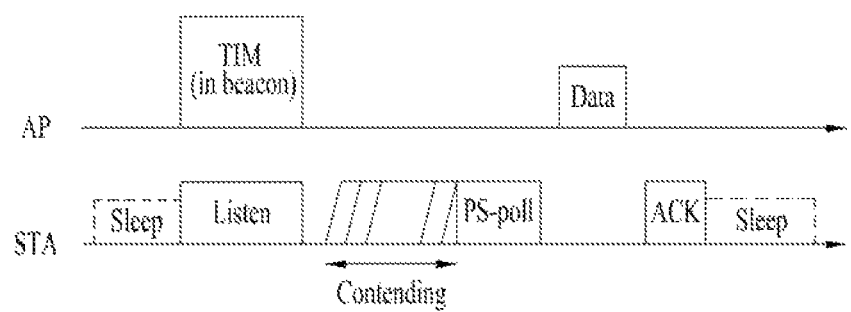
FIGS. 10 to 12 are diagrams for explaining detailed operations of an STA that has received a TIM.
Figure 11:
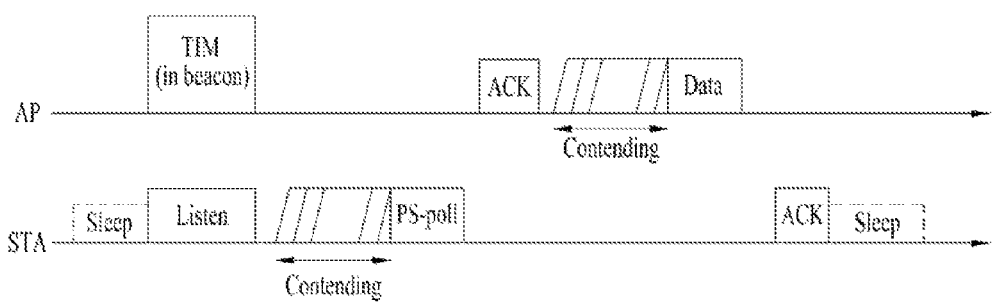
Figure 12:
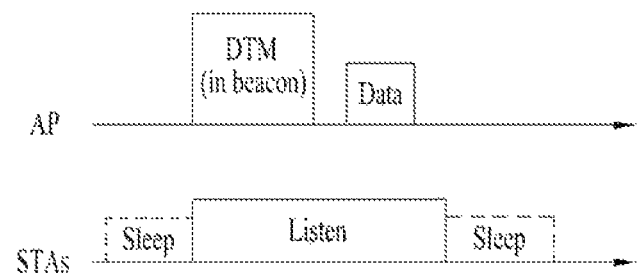

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit, to the AP, the ACK frame indicating that the data frame has successfully been received and may transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintain the awake state after reception of the beacon frame including the DTIM, the STAs may receive data and then switch to the sleep state after completion of data reception.

TIM Structure

In the operation and management method of the PS mode based on the TIM (or DTIM) protocol described with reference to FIGS. 9 to 12, STAs may determine whether a data frame to be transmitted for the STAs through STA identification information contained in a TIM element. The STA identification information may be information associated with an AID to be allocated when an STA is associated with an AP.

The AID is used as a unique ID of each STA within one BSS. For example, the AID for use in the current WLAN system may be allocated as one of 1 to 2007. In the currently defined WLAN system, 14 bits for the AID may be allocated to a frame transmitted by an AP and/or an STA. Although the AID value may be assigned up to 16383, the values of 2008 to 16383 are set to reserved values.

A TIM element according to legacy definition is inappropriate to apply an M2M application through which many STAs (for example, more than 2007 STAs) are associated with one AP. If a conventional TIM structure is extended without any change, since the TIM bitmap size excessively increases, it is impossible to support the extended TIM structure using a legacy frame format and the extended TIM structure is inappropriate for M2M communication in which application of a low transfer rate is considered. In addition, it is expected that there are a very small number of STAs each having a reception data frame during one beacon period. Therefore, according to exemplary application of the above-mentioned M2M communication, since it is expected that most bits are set to zero (0) although the TIM bitmap size is increased, technology capable of efficiently compressing a bitmap is needed.

In legacy bitmap compression technology, successive values of 0 are omitted from a front part of a bitmap and the omitted result may be defined as an offset (or start point) value. However, although STAs each including a buffered frame is small in number, if there is a high difference between AID values of respective STAs, compression efficiency is not high. For example, assuming that only a frame to be transmitted to two STAs having AID values of 10 and 2000 is buffered, the length of a compressed bitmap is set to 1990 but the remaining parts other than both end parts are assigned zero. If fewer STAs are associated with one AP, inefficiency of bitmap compression does not cause serious problems. However, if the number of STAs associated with one AP increases, such inefficiency may deteriorate overall system performance.

Figure 13:
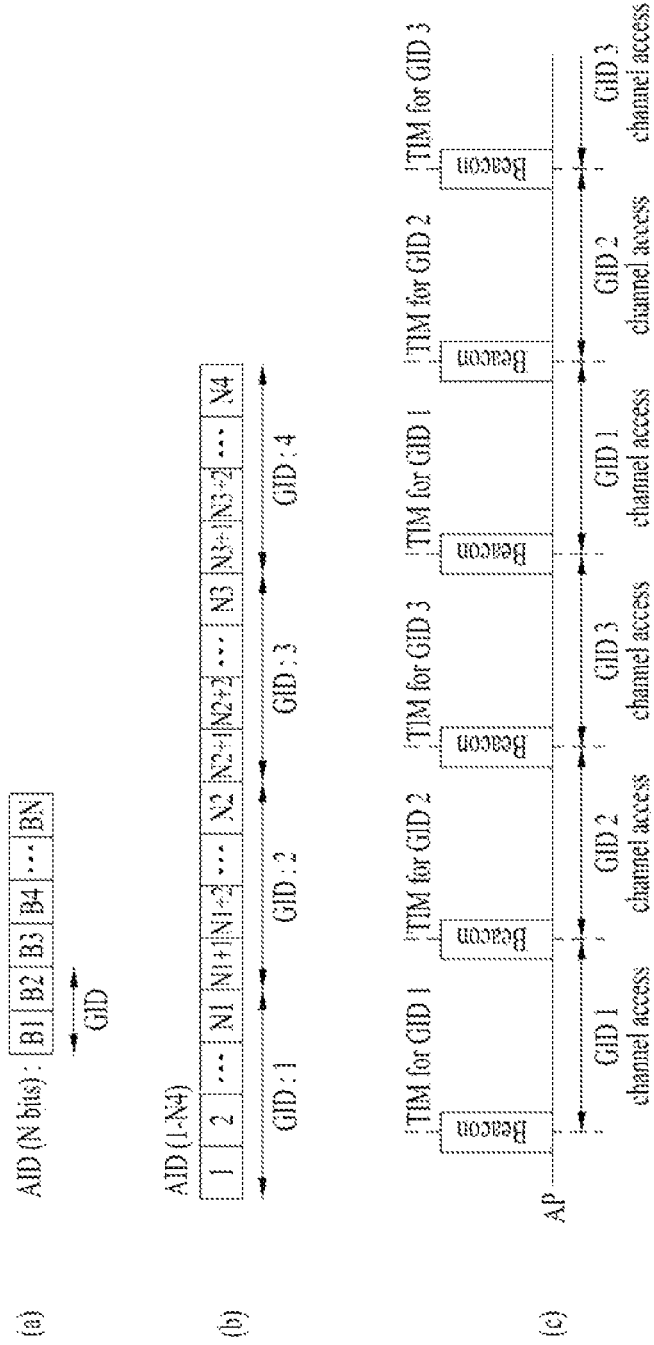
FIG. 13 is a diagram for explaining a group-based AID.

In order to solve the above-mentioned problems, AIDs are divided into a plurality of groups such that data can be more efficiently transmitted. A designated group ID (GID) is allocated to each group. AIDs allocated on a group basis will be described with reference to FIG. 13.

FIG. 13(a) is a diagram illustrating an exemplary group-based AID. In FIG. 13(a), a few bits located at the front part of an AID bitmap may be used to indicate a GID. For example, it is possible to designate four GIDs using the first two bits of an AID bitmap. If a total length of the AID bitmap is N bits, the first two bits (B1 and B2) may represent a GID of the corresponding AID.

FIG. 13(a) is a diagram illustrating another exemplary group-based AID. In FIG. 13(b), a GID may be allocated according to the position of the AID. In this case, AIDs having the same GID may be represented by offset and length values. For example, if GID 1 is denoted by offset A and length B, this means that AIDs of A to A+B−1 on a bitmap have GID 1. For example, FIG. 13(b) assumes that AIDs of 1 to N4 are divided into four groups. In this case, AIDs contained in GID 1 are denoted by 1 to N1 and the AIDs contained in this group may be represented by offset 1 and length N1. Next, AIDs contained in GID 2 may be represented by offset N1+1 and length N2-N1+1, AIDs contained in GID 3 may be represented by offset N2+1 and length N3-N2+1, and AIDs contained in GID 4 may be represented by offset N3+1 and length N4-N3+1.

If the aforementioned group-based AIDs are introduced, channel access may be allowed in a different time interval according to GIDs, so that the problem caused by the insufficient number of TIM elements with respect to a large number of STAs can be solved and at the same time data can be efficiently transmitted/received. For example, during a specific time interval, channel access is allowed only for STA(s)

corresponding to a specific group and channel access to the remaining STA(s) may be restricted. A predetermined time interval in which access to only specific STA(s) is allowed may also be referred to as a restricted access window (RAW).

Channel access based on GID will now be described with reference to FIG. 13(c). FIG. 13(c) exemplarily illustrates a channel access mechanism according to a beacon interval when AIDs are divided into three groups. A first beacon interval (or a first RAW) is a specific interval in which channel access to STAs corresponding to AIDs contained in GID 1 is allowed and channel access of STAs contained in other GIDs is disallowed. To implement this, a TIM element used only for AIDs corresponding to GID 1 is contained in a first beacon. A TIM element used only for AIDs corresponding to GID 2 is contained in a second beacon frame. Accordingly, only channel access to STAs corresponding to the AIDs contained in GID 2 is allowed during a second beacon interval (or a second RAW). A TIM element used only for AIDs having GID 3 is contained in a third beacon frame, so that channel access to STAs corresponding to the AIDs contained in GID 3 is allowed during a third beacon interval (or a third RAW). A TIM element used only for AIDs having GID 1 is contained in a fourth beacon frame, so that channel access to STAs corresponding to the AIDs contained in GID 1 is allowed during a fourth beacon interval (or a fourth RAW). Thereafter, only channel access to STAs belonging to a specific group indicated by a TIM contained in a corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is cyclic or periodic according to the beacon interval, the scope of the present invention is not limited thereto. That is, only AID(s) contained in specific GID(s) may be contained in a TIM element, so that channel access only to STA(s) corresponding to the specific AID(s) is allowed during a specific time interval (e.g. a specific RAW) and channel access to the remaining STA(s) is disallowed.

The aforementioned group-based AID allocation scheme may also be referred to as a hierarchical structure of a TIM. That is, a total AID space is divided into a plurality of blocks and channel access to STA(s) (i.e. STA(s) of a specific group) corresponding to a specific block having any one of values other than '0' may be allowed. Therefore, since a large-sized TIM is divided into small-sized blocks/groups, an STA can easily maintain TIM information and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of an AID bitmap may represent a page ID (i.e. PID), the next N2 bits may represent a block ID, the next N3 bits may represent a sub-block ID, and the remaining bits may represent the position of STA bits contained in a sub-block.

In examples of the present invention described hereinbelow, various schemes for segmenting STAs (or AIDs allocated to the respective STAs) in the unit of predetermined hierarchical groups and managing the segmented STAs may be used and a group based AID allocation scheme is not restricted thereto.

PPDU Frame Format

A physical layer convergence protocol (PLCP) packet data unit (PPDU) frame format may include a short training field (STF), a long training field (LTF), a signal (SIG) field, and a Data field. The most fundamental (e.g. non-high throughput (HT)) PPDU frame format may only include a legacy-STF (L-STF), a legacy-LTF (L-LTF), a SIG field, and a Data field. Additional (or other types of) STF, LTF, and SIG fields may be included between the SIG field and the Data field according to type of the PPDU frame format (e.g. an HT-mixed format PPDU, an HT-greenfield format PPDU, a very high throughput (VHT) PPDU, etc.).

The STF includes signals for signal detection, automatic gain control (AGC), diversity selection, precise time synchronization, etc. The LTF includes signals for channel estimation, frequency error estimation, etc. The STF and the LTF may be collectively referred to as a PLCP preamble. The PLCP preamble may include signals for synchronization of an OFDM physical layer and channel estimation.

The SIG field may include a Rate field and a Length field. The Rate field may include information about data modulation and coding rate. The Length field may include information about the length of data. Additionally, the SIG field may include a parity bit, a SIG tail bit, etc.

The Data field may include a Service field, a PLCP service data unit (PSDU), and a PPDU tail bit. When necessary, the Data field may include a padding bit. Some bits of the Service field may be used for synchronization of a descrambler at a receiving side. The PSDU corresponds to a MAC PDU defined in a MAC layer and may include data generated/used in a higher layer. The PPDU tail bit may be used to return an encoder to state 0. The padding bit may be used to adjust the length of the Data field in a predetermined unit.

The MAC PDU is defined according to various MAC frame formats. A basic MAC frame includes a MAC header, a frame body, and a frame check sequence (FCS). The MAC frame is configured with a MAC PDU and may be transmitted/received through a PSDU of a data part of the PPDU frame format.

Meanwhile, a null data packet (NDP) frame format is a frame format which does not include a data packet. That is, an NDP frame format includes only a PLCP header part (i.e. an STF, an LTF, and a SIG field) in a normal PPDU format and does not include the other parts (i.e. a Data field).

Channel Access Scheme

Figure 14:
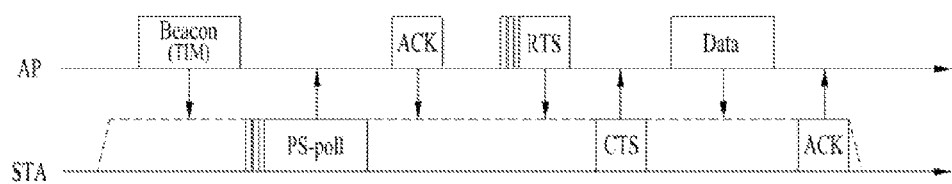
FIG. 14 is a diagram for explaining a PS-Poll mechanism.

FIG. 14 is a diagram for explaining a PS-Poll mechanism. FIG. 14 corresponds to a detailed example of the PS-Poll mechanism of FIG. 11.

As described above, an STA may be aware of whether data to be transmitted thereto from an AP is present through a TIM element of a beacon. The STA, which has confirmed that there is data to be transmitted thereto, may transmit a PS-Poll frame in order to request that the AP transmit data (i.e. downlink (DL) data). Upon receiving the PS-Poll frame, the AP may transmit data to the STA through contention. Specifically, the AP which is to transmit data may transmit an RTS frame to the STA and the STA which is to receive the data may transmit a CTS frame to inform the AP that it will receive the data. Then, the AP may transmit a data frame to the STA and receive an ACK frame. In this case, the AP may transmit only one physical layer service data unit (PSDU) to the STA at a time. Accordingly, when there is a large amount of data to be transmitted from the AP to the STA, the AP should transmit data through contention in response to a new PS-Poll from the STA. This may cause inefficient data transmission.

Figure 15:
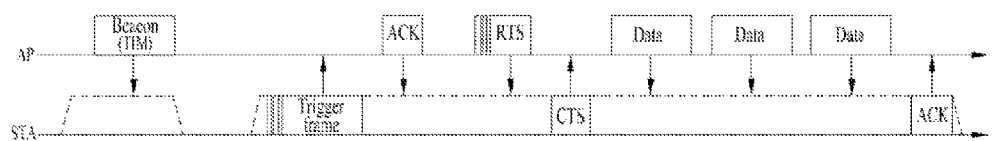
FIG. 15 is a diagram for explaining a U-APSD mechanism.

FIG. 15 is a diagram for explaining a U-APSD mechanism.

According to an unscheduled-automatic power save delivery (U-APSD) mechanism, the STA may inform the AP of a requested transmission duration in order to use a U-APSD service period (SP) and the AP may transmit a frame to the STA during the SP. According to the U-APSD mechanism, the STA may receive plural PSDUs at a time from the AP using the SP thereof.

Referring to FIG. 15, the STA may recognize that data that the AP desires to transmit to the STA is present through a TIM element of a beacon. Next, the STA may inform the AP that an SP thereof is started by transmitting a Trigger frame to the AP at a desired time and request that the AP transmit data. The AP may transmit ACK as a response to the Trigger frame. Next, the AP transmits an RTS frame to the STA through contention, receives a CTS frame from the STA, and then transmits the data to the STA. The data transmitted by the AP may include one or more data frames. Upon transmitting the last data frame to the STA, the AP may set an end-of-service-period (EOSP) in the data frame to 1. Then, the STA may recognize this and end the SP. The STA may transmit ACK indicating that data has been successfully received to the AP. In this way, according to the U-APSD mechanism, the STA may receive data by starting the SP thereof at a desired time and receive multiple data frames in one SP, thereby efficiently receiving the data.

Meanwhile, exchange of an RTS/CTS frame during data transmission/reception as illustrated in FIGS. 14 and 15 in order to prevent a hidden node problem causes much signaling overhead both in a transmitter and a receiver. In addition, as illustrated in FIG. 15, a long time is consumed from a time when the STA requests that the AP transmit data by transmitting the Trigger frame to a time when the AP prepares data to be transmitted to the STA, performs contention for data transmission, and actually starts data transmission after transmission and reception of the RTS/CTS frame. Therefore, the STA may consume much power.

For example, in a hidden environment, any STA may not overhear a PS-Poll frame transmitted by another STA and collision between PS-Poll frames simultaneously transmitted from multiple STAs may occur. Furthermore, in an environment in which many STAs are associated with one AP as in M2M communication, the hidden node problem may more frequently occur. Even though a method such as conventional CTS/RTS exchange is used to solve the hidden node problem, power consumption caused by transmission and reception of the CTS/RTS frame may be a heavy burden to a low-power STA suitable for M2M communication.

To solve such a problem, according to the present invention, a duration which can be used as an SP may be predetermined between an AP and an STA and the AP may perform operation for preparing data to be transmitted to the STA. Therefore, the STA may inform the AP of an SP thereof by transmitting an SP-Poll (or SP triggering) frame to the AP and may request the AP to transmit data. The SP-Poll frame may include information indicating the SP (e.g. an SP start time, an SP duration, an SP interval, an SP end time, etc.) and the AP can be aware in advance of a time at which the next SP is started from the information indicating the SP. An SP generated according to the above description may be referred to as a polled-SP.

Short Frame Format

As described above, a specific STA may operate in the manner of obtaining an exclusive transmission opportunity (TXOP) during an SP. That is, the specific STA may perform transmission and reception of plural data frames without contention during a set SP. To this end, control information about SP configuration needs to be exchanged between an STA and an AP. However, in a circumstance in which many STAs are associated with the AP, signaling overhead for SP configuration for a specific STA or STA group may deteriorate system performance.

Specifically, in the case in which a frame for triggering an unscheduled SP is transmitted, if a conventional MAC frame format is used, much overhead may be unnecessarily generated. Accordingly, the present invention proposes a new MAC frame format except for an unnecessary information field which is not used in a MAC header, for power saving trigger of an STA. Then, signaling overhead and STA power consumption can be reduced and more efficient transmission can be performed.

The present invention proposes a short frame format for exchanging SP configuration and related parameters between an STA and AP. The short frame may be categorized into a short data frame and a short null frame according to whether an SP is started at the same time when the STA transmits data to the AP. The short null frame may also be called a short null data packet (NDP) frame which will be described in detail with reference to FIG. 16.

FIG. 16 is a diagram for explaining an exemplary short frame format.

The short frame format illustrated in FIG. 16 is different from a normal frame format in that a frame body field is excluded. The frame body field of the normal frame format may include transmitted and received data. Specifically, the transmitted and received data may correspond to the other part except for a MAC header and a frame check sequence (FCS) part from a MAC control frame, a management frame, an action frame, or a data frame.

FIG. 16(a) is a diagram illustrating a short data frame. As illustrated in FIG. 16, the short data frame may include a Short Frame Control field, a receiver address (RA) field, a transmitter address (TA) field, and a frame check sequence (FCS) field.

The RA field may indicate a MAC address for identifying a device (e.g. an AP or STA) directly receiving the short data frame and the TA field may indicate a MAC address for identifying a device (e.g. an STA) transmitting the short data frame. The FCS field is used for error search of the short data frame.

The Short Frame Control field of the short data frame may include a Short Frame Indication field, a Short Frame Type field, a Short Frame subtype field, a To DS field, a From DS field, a Via AP field, a power management (PM) field, an access category (AC) field, an end of service period (EOSP) field, a Retry field, a more data (MD) field, a Protected field, and a Reserved field. Here, the Short Frame Control field does not need to include all of the above fields and some fields may be omitted when necessary.

The Short Frame Indication field in the Short Frame Control field indicates whether a corresponding frame is a short frame or a normal frame.

If the Short Frame Indication field indicates that a corresponding frame is a short frame, the Short Frame Type field may be used to define the type of the short frame. Specifically, the Short Frame Type field may indicate whether the short frame is a short data frame or a short null frame.

The Short Frame subtype field defines subtypes of the short frame. The Short Frame subtype field may also indicate whether the short frame is a short data frame or a short null frame.

The To DS field and the From DS field indicate whether the short frame is directed to a DS or directed from the DS. For example, when communication between STAs is performed in the same BSS, since association is not established with the DS, both the To DS field and the From DS field may be set to '0'. Unlike this case, if an STA transmits the short frame to the DS, the To DS field may be set to '1' and the From DS field may be set to '0'. On the contrary, if the STA receives the short frame from the DS, the To DS field may be set to '0' and the From DS field may be set to '1'. If the STA performs communication with an STA in another BSS, both the To DS field and the From DS field may be set to '1'.

The Via AP field may be used to replace another field except for other existing address information when necessary.

The PM field indicates whether a transmitter is in a power saving mode. For example, if the transmitter is in a power saving mode, the PM field may be set to '1' and if the transmitter is an activated state, the PM field may be set to '0'.

The AC field may be used to indicate or assign an AC related to the short frame. Specifically, the AC field may indicate one or more ACs which can be transmitted by an STA or can be triggered by the STA. The AC related to the short frame may include at least one of AC_BE (best effort), AC_BK (background), AC_VI (video), and AC_VO (voice). Although the AC field is 2 bits in FIG. 1, the AC field may be extended to 4 bits so that the 4 bits may indicate whether four ACs for AC_BE, AC_BK, AC_VI, and AC_VO are permitted, respectively. According to another example of the present invention, a traffic ID (TID) field may be inserted instead of the AC field. Although the TID field may be configured with 4 bits to include full TID information, the TID field may be configured to include partial TID information with size less than 4 bits.

The EOSP field indicates the end of an SP and the Retry field indicates whether the short frame is a retransmission frame.

FIG. 16(b) is a diagram illustrating a short null frame. In FIG. 16(b), fields indicated by the same terms as FIG. 16(a) are as described with reference to FIG. 16(a) and, therefore, a detailed description thereof will be omitted. Referring to FIG. 16(b), a Short Frame Control frame of the short null frame may exclude the Retry field, the MD field, and the Protected field from the Short Frame Control field of the short data frame. The Short Frame Control field of the short null frame may include a maximum (Max) SP Length field.

The Max SP Length field may be used to indicate the maximum number of all buffered data units transmitted to an STA for triggering an SP. The data unit may include at least one of MAC service data units (MSDUs), aggregated MSDUs (A-MSDUs), and MAC management protocol data unit (MMPDUs).

Table 1 shows an indication value according to an index value of the Max SP Length field.

TABLE 1

| Index value of Max SP Length | Description |
| --- | --- |
| 00 | AP transmits all buffered MSDUs/A-MSUDUs/MMPDUs. |
| 01 | AP transmits a maximum of two buffered MSDUs/A-MSUDUs/MMPDUs. |
| 10 | AP transmits a maximum of four buffered MSDUs/A-MSUDUs/MMPDUs. |
| 11 | AP transmits a maximum of six buffered MSDUs/A-MSUDUs/MMPDUs. |

If the transmission number of data units is equal to a maximum number determined in the Max SP Length field, an SP may be ended.

Generally, a field including all parameters of the SP has a length of 4 octets. In the short data null frame, overhead can be reduced by inserting the Max SP Length field of a minimum of two bits instead of the SP field of 4 octets.

The length (e.g. 2 bits) of the Maxi SP Length field may be set to the same value as a value set in an APSD setting process so that corresponding short null frame transmission may be associated with APSD DL delivery information. This serves to use the short null frame in an APSD mechanism.

The end of an SP may be indicated using the EOSP field of the data frame together with the Max SP Length field of the short null frame. This causes an STA to consume power and transmit and receive data only during an SP of the STA.

In the example of FIG. 16, the RA field may also be set to a basic service set identification (BSSID) field. The TA field may also be replaced with a 2-octet association ID (AID) field. However, in order to replace the TA field with the AID field, it should be assumed that a mechanism such as AID change and update is applied to a system so as not to form an environment which may cause ambiguity of transmission.

As described with reference to FIGS. 16(a) and 16(b), the short data frame and the short null frame may have a common structure of fields up to the PM field. In the case of the short data frame for transmitting data, the Retry field, the MD field, and the Protected field support data transmission. In the case of the short null frame for triggering only data reception without transmitting data, information about an SP is set and an information field between the two short frames may be efficiently configured according to each usage.

However, all information blocks illustrated in FIG. 16 are not always included in the short frame and some blocks may be omitted. The size or arranged order of each information block may be applied differently from the examples of FIG. 16.

Improved Channel Access Method Improving Short Frame Format

In a legacy WLAN system, an STA which is to use a medium may inform another STA of a remaining time until the medium enters an available state by using an NAV. That is, a value set to the NAV corresponds to a duration during which use of the medium is scheduled by an STA transmitting a corresponding frame and another STA receiving the NAV value is prohibited from accessing the medium during the duration. The NAV may be set according to a value of a duration field of a MAC header.

In the legacy WLAN, since overhead for the duration field is not insignificant (e.g. 2-octet overhead is demanded), the duration field is generally omitted in a short frame (e.g. a short data frame or null frame) format having the purpose of minimizing signaling overhead. If such a short frame format is used, operation for prohibiting another STA from accessing a medium through the NAV cannot be supported.

Meanwhile, according to a normal PS-Poll frame, only transmission and reception of one data frame and only transmission and reception of an ACK frame responding to the data frame are permitted through one PS-Poll frame. In an SP set using a short frame format proposed in the present invention, transmission and reception of plural data frames and transmission and reception of ACK frames corresponding thereto should be permitted. In addition, in the SP proposed in the present invention, transmission and reception of plural data frames of a specific STA should be performed without contention, as described above. To correctly support such operation, a new mechanism for prohibiting another STA from accessing a medium even while using the short frame format is needed.

Figure 17:
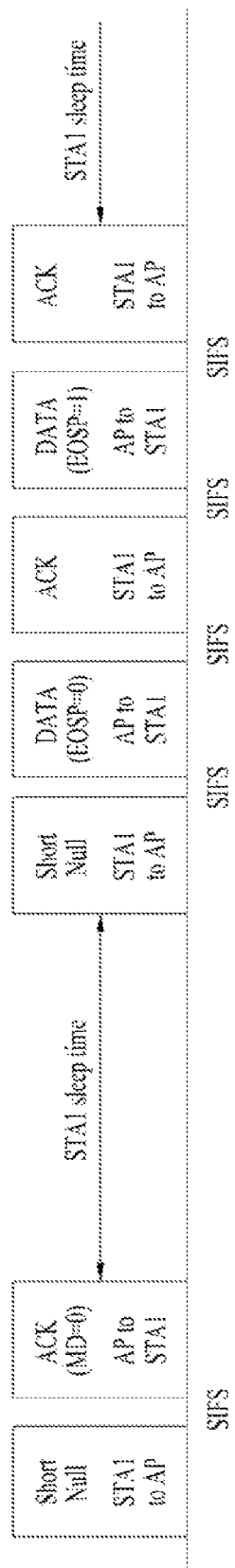
FIG. 17 is a diagram for explaining an improved channel access method according to an example of the present invention.

FIG. 17 is a diagram for explaining an improved channel access method according to an example of the present invention.

FIG. 17 illustrates an operation in which STA1, which has transmitted a Short Null frame, receives the first data from an AP without contention after an SIFS time. To support this, other STAs, which have detected the Short Null frame, should set an NAV through specific information. To set the NAV, channel access of other STAs should be deferred by time consumed for transmission and reception of at least one Data frame and transmission and reception of an ACK frame.

Once transmission and reception of the Data frame (or the Data frame and ACK frame) are performed, it is possible to set an NAV of other STAs using a duration field of a MAC header included in the Data frame or ACK frame. Therefore, time length which is referred to when other STAs set the NAV through the Short Null frame may correspond to time consumed to transmit and receive the first Data frame (or the Data frame and ACK frame) in an SP. To this end, the present invention proposes a new mechanism as follows.

As an example of the present invention, a short frame format (e.g. a short data frame or a null frame format) including a duration field may be transmitted.

FIG. 18 is a diagram for explaining a new short frame format proposed in the present invention.

The new short frame format of FIG. 18 further includes a Duration field between a Short Frame Control field and an RA field, in comparison with the example of FIG. 16. A detailed description of the other fields (i.e. Short Frame Control, RA, TA, and FCS fields) except for the Duration field may refer to the description of FIG. 16.

In the example of FIG. 18, the Duration field does not need to be set to time length including all of a plurality of Data fields (a plurality of Data fields and ACK frames) in an SP and may be set to a value corresponding to time length consumed to transmit and receive the first Data frame (or Data frame and ACK frame). This is because, in the other Data frames except for the first Data frame, an NAV of other STAs can be set/updated through the Duration field included in the previous Data frame (or ACK frame).

In addition, using information of a Max SP Length field included in a Short Frame Control field in a short frame format transmitted by a specific STA, other STAs may implicitly predict a time duration during which a specific STA is permitted to perform medium access (or channel access) without contention (i.e. a time duration during which other STAs are prohibited for performing medium access (or channel access)).

A Max SP Length field defined in a conventional WLAN system is information of long-term or semi-static attributes configured through an association request/response (or re-association request/response) process and is set to a maximum value capable of being applied in the long term (i.e. considering various cases). Then, an AP has operated to support transmission and reception of data packets of a number not exceeding the maximum value while an STA is associated (or before a new association is established). However, since the Max SP Length field proposed in the present invention is information included in a short frame format (e.g. a short trigger frame, etc.), the Max SP Length field may be dynamically configured. Accordingly, the Max SP Length field proposed in the present invention does not need to be set to a maximum value and may be set to a value corresponding to the number of data packets triggered by a corresponding short frame. In addition, the value of the Max SP Length field included in the short frame format may be dynamically set within the range of not exceeding a maximum value set in a conventional Max SP Length field in an association (or re-association) process. This may be favorably applied in that resources can be flexibly allocated/used as compared with a conventional U-APSD scheme.

As in the above-described examples, the Duration field additionally defined in the short data format proposed in the present invention does not need to include information indicating long time length and only needs to indicate minimum time length. Accordingly, the Duration field additionally defined in the short data format proposed in the present invention does not need to be defined up to 2 octets as in the conventional Duration field and may be defined by one-octet length.

As another example of the present invention, a method in which other STAs defer medium access (or channel access) during a prescribed time period without using the Duration field will now be described.

If other STAs detect a short frame format (e.g. a short data frame or a null frame format) transmitted by a specific STA, the STAs may implicitly recognize that an SP corresponding to prescribed time length is set for the specific SP starting from a time when the short frame is detected and may defer medium access (or channel access) during the prescribed time length.

Information about the prescribed time length may be pre-indicated to STAs belonging to a BSS or may be preset. For example, the information about the prescribed time length may be indicated/set through a specific management frame (e.g. an association request/response frame, a probe request/response frame, etc.). Alternatively, the information about the prescribed time length may be periodically announced to STAs in the BSS through a specific broadcast signal (e.g. a beacon). If an SP of STAs is allowed to be dynamically set, the information about the prescribed time length may be continuously announced by an updated scheme. Upon receiving a plurality of information about the prescribed time length, STAs may use information about the latest received/announced/updated time length. That is, when a specific STA detects a short frame of another STA, the specific STA may set time length (or an NAV) during which it should defer medium access (or channel access) using the latest received value among the information about the prescribed time length.

The prescribed time length may be set to time length from a time when an SP is started by a short frame to a time when the first Data frame (or Data frame and ACK frame) is received. Then, upon detecting a short frame of another STA, a specific STA may set a first NAV using the prescribed time length and set/update a subsequent NAV from a value of a Duration field of a MAC header included in the first Data frame (or ACK frame). Alternatively, upon detecting the short frame of another STA, the specific STA may defer medium access (or channel access) by total time length obtained by adding time length derived from information about the number of data packets determined by maximum SP length proposed in the present invention to the prescribed time length.

In the above-described example of the present invention, a method for controlling/deferring channel access (or setting an NAV) of other STAs (third party STAs) has been described using the Duration field or Max SP Length field explicitly included in the short frame format or based on prescribed time length provided in advance in the BSS without adding an explicit field in the short frame format. As an additional example of the present invention, a method in which third party STAs set an NAV using a SIG field included in a PLCP header of a frame format will be described below.

As described above, according to a conventional operation, if information about the Duration field is not included in the short frame (or a frame including a short frame header), a third party STA cannot set an NAV for deferring channel access. Therefore, the present invention proposes a method for setting the NAV of the third party STA using a specific field of a PHY SIG field of a PLCP header always included in the short frame format.

Specifically, if the third party STA is able to estimate/calculate, as a predetermined level, data packet magnitude for a specific STA, ACK response magnitude corresponding to a data packet for the specific STA, or time/duration information occupied by a channel by the specific STA by using an ACK policy field included in the SIG field, the third party STA may operate to defer channel access even without setting an NAV. The following Table 2 indicates an ACK policy field (or ACK indication field) included in a PHY SIG field. This is purely exemplary and the ACK policy field (or ACK indication field) may be configured according to other classification schemes.

TABLE 2

| ACK Indication | Description |
| --- | --- |
| 00 | ACK |
| 01 | BLOCK ACK (BA) |
| 10 | No ACK |
| 11 | Frame other than ACK, BA, or CTS |

If the ACK indication field indicates 'ACK', the third party STA may defer channel access by time corresponding to maximum available data packet (i.e. time consumed for data packet transmission)+SIFS+ACK size (i.e. time consumed for ACK frame transmission)+time consumed for other transmissions. Here, the time consumed for other transmissions may include propagation delay, transmission/reception turn-around time, PHY/MAC processing delay, etc. and which elements will be included in the time consumed for other transmissions and which values correspond to the elements may be set according to a system situation.

If the ACK indication field indicates 'BA', the third party STA may defer channel access by time corresponding to N*maximum available data packet (i.e. time consumed for data packet transmission)+SIFS+BA size (i.e. time consumed for BA frame transmission)+time consumed for other transmissions. Here, N is defined as a parameter having an integer value and may be set according to a system environment.

If the ACK indication field indicates 'No ACK', the third party STA may defer channel access by time corresponding to maximum available data packet (i.e. time consumed for data packet transmission)+time consumed for other transmissions.

If the ACK indication field indicates 'Frame other than ACK, BA or CTS', the third party STA may defer channel access by time corresponding to 2*maximum available data packet (i.e. time consumed for data packet transmission)+SIFS+time consumed for other transmissions. In this case, since frames may continue to be transmitted at an interval of an SIFS, the third party STA may receive (or listen to) the continuously transmitted frames and update time length for deferring channel access using one or more of the Duration, Max SP Length, and ACK Indication fields in a corresponding frame.

If the third party STA fails to decode a PLCP header (e.g. occurrence of an error, degradation of a channel state, etc.), the third party STA cannot confirm an ACK indication bit included in the SIG field. In this case, the third party STA may operate to defer channel access by a maximum TXOP duration (i.e. length of a time duration capable of being maximally set for a TXOP) as a default value.

As in the above examples of the present invention, third party STAs may defer channel access by prescribed time length, further defer channel access by a DIFS, and then start backoff count.

Figure 19:
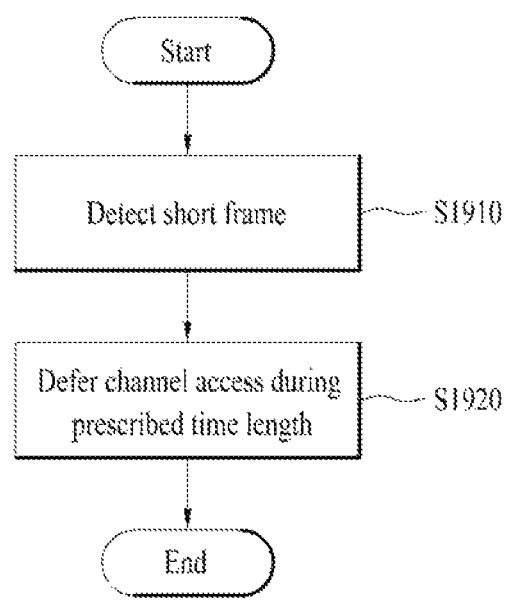
FIG. 19 is a diagram for explaining a channel access control method of an STA according to an example of the present invention.

FIG. 19 is a diagram for explaining a channel access control method of an STA according to an example of the present invention.

In step S1910, a specific STA may detect a short frame (e.g. a short data frame or a short null frame) transmitted by another STA. Upon detecting the short frame of another STA, the specific STA may defer channel access thereof during prescribed time length using related information in step S1920. The related information may be a value of a Duration field included in the short frame or a value of a Max SP Length field included in the short frame. Alternatively, the specific STA may perform a deferring operation of channel access based on a predetermined value pre-provided/preset by a network. The specific STA may determine the prescribed time length based on an ACK Indication field included in a SIG field of a PLCP header.

In the channel access control method described with reference to FIG. 19, the above described various embodiments of the present invention may be independently applied or two or more embodiments thereof may be simultaneously applied.

Figure 20:
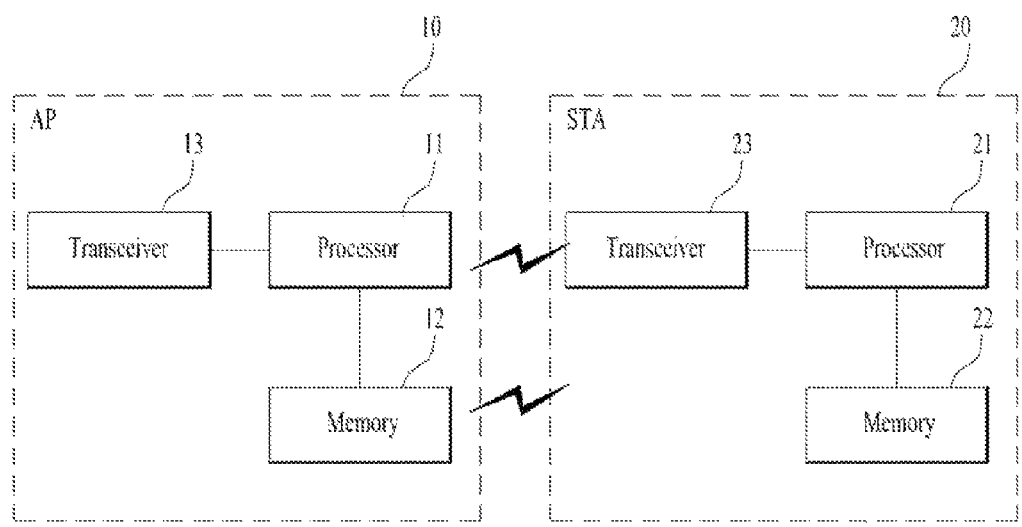
FIG. 20 is a block diagram illustrating a radio device according to an embodiment of the present invention.

FIG. 20 is a block diagram illustrating a radio device according to an embodiment of the present invention.

An AP 10 may include a processor 11, a memory 12, and a transceiver 13. An STA 20 may include a processor 21, a memory 22, and a transceiver 23. The transceivers 13 and 23 may transmit/receive radio signals and may implement a physical layer based on an IEEE 802 system. The processors 11 and 21 are connected to the transceivers 13 and 21, respectively, and may implement a physical layer and/or a MAC layer based on the IEEE 802 system. The processors 11 and 21 may be configured to perform operations according to the above described various embodiments of the present invention. Modules for implementing operations of the AP and STA according to the above described various embodiments of the present invention may be stored in the memories 12 and 22 and may be carried out by the processors 11 and 21. The memories 12 and 22 may be included in the processors 11 and 21 or may be installed at the exterior of the processors 11 and 21 to be connected by a known means to the processors 11 and 21.

The overall configurations of the AP and STA may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A channel access control method of a station (STA) of a wireless communication system, the method comprising:
   detecting a short frame transmitted by another STA; and
   deferring channel access of the STA during prescribed time length,
   wherein the short frame is a frame for triggering a serving period permitting transmission and reception of a plurality of data frames of the other STA, and
   the prescribed time length is set to a value corresponding to time length from a time when the service period is started to a time when transmission and reception of a first data frame among the data frames of the other STA is finished.

2. The channel access control method according to claim 1, wherein the prescribed time length is set based on a value of a duration field included in the short frame.

3. The channel access control method according to claim 2, wherein the duration field has a length of 1 octet.

4. The channel access control method according to claim 1, wherein the prescribed time length is determined based on a maximum service period length field included in the short frame.

5. The channel access control method according to claim 4, wherein the maximum service period length field included in the short frame is determined based on information indicating the number of the data frames transmitted and received by the other STA during the service period.

6. The channel access control method according to claim 1 wherein the prescribed time length is determined by a value pre-provided in a basic service set (BSS) to which the STA belongs.

7. The channel access control method according to claim 6, wherein, if the STA receives a plurality of pre-provided values, a most recently received value is used.

8. The channel access control method according to claim 6, wherein the pre-provided value is provided through a response frame responding to a request frame transmitted by the STA or through a broadcast signal transmitted to the STA.

9. The channel access control method according to claim 1, wherein the deferring the channel access includes setting a network allocation vector (NAV) corresponding to the prescribed time length.

10. The channel access control method according to claim 1, wherein the short frame is defined as a frame excluding a frame body.

11. The method according to claim 1, wherein the short frame is either a short data frame or a short null frame.

12. A station (STA) for controlling channel access in a wireless communication system, the STA comprising:
   a transceiver module; and
   a processor,
   wherein the processor is configured to detect a short frame transmitted by another STA by using the transceiver; and defer channel access of the STA during prescribed time length,
   wherein the short frame is a frame for triggering a serving period permitting transmission and reception of a plurality of data frames of the other STA, and
   wherein the prescribed time length is set to a value corresponding to time length from a time when the service period is started to a time when transmission and reception of a first data frame among the data frames of the other STA is finished.

* * * * *